United States Patent
Tsai et al.

(10) Patent No.: US 10,929,958 B1
(45) Date of Patent: Feb. 23, 2021

(54) METHOD AND IMAGE PROCESSING DEVICE FOR IMAGE BLURRING

(71) Applicant: Novatek Microelectronics Corp., Hsinchu (TW)

(72) Inventors: Wan-Ching Tsai, Taipei (TW); Shu-Chun Lin, Kaohsiung (TW)

(73) Assignee: Novatek Microelectronics Corp., Hsinchu (TW)

(*) Notice: Subject to any disclaimer, the term of this patent is extended or adjusted under 35 U.S.C. 154(b) by 0 days.

(21) Appl. No.: 16/684,606

(22) Filed: Nov. 15, 2019

(51) Int. Cl.
*G06T 5/00* (2006.01)
*G06T 5/20* (2006.01)

(52) U.S. Cl.
CPC .......... *G06T 5/002* (2013.01); *G06T 5/009* (2013.01); *G06T 5/20* (2013.01)

(58) Field of Classification Search
None
See application file for complete search history.

(56) References Cited

U.S. PATENT DOCUMENTS

| | | | | |
|---|---|---|---|---|
| 8,194,759 B2* | 6/2012 | Hagai | .................. | H04N 19/176 375/240.29 |
| 8,831,346 B2* | 9/2014 | Mitsunaga | .............. | G06T 5/002 382/171 |
| 9,769,496 B2* | 9/2017 | Wada | ..................... | H04N 19/86 |
| 2009/0245679 A1* | 10/2009 | Ohwaki | .................... | G06T 5/20 382/260 |
| 2011/0050934 A1* | 3/2011 | Mitsunaga | .............. | G06T 5/002 348/222.1 |
| 2011/0273531 A1* | 11/2011 | Ito | ........................ | H04N 13/261 348/43 |
| 2012/0250998 A1* | 10/2012 | Mitsunaga | .............. | G06T 5/002 382/171 |
| 2014/0085537 A1* | 3/2014 | Chujoh | .................. | H04N 19/85 348/453 |

OTHER PUBLICATIONS

Paris, Sylvain. "A gentle introduction to bilateral filtering and its applications." ACM SIGGRAPH 2007 courses. 2007. 3-es. (Year: 2007).*

* cited by examiner

*Primary Examiner* — Andrae S Allison
(74) *Attorney, Agent, or Firm* — JCIPRNET

(57) ABSTRACT

A method and an image processing device for image enhancement are proposed. The method includes the following steps. An input image is received. A curve set is applied on the input image to generate a resultant image, where the curve set includes a plurality pairs of weight functions and process functions, where a summation of a multiplication of the weight function and the process function in each of the pairs is zero, and where the weight function in each of the pairs is associated with low-pass filtering. An output image is generated according to the resultant image and the input image.

20 Claims, 5 Drawing Sheets

US 10,929,958 B1

METHOD AND IMAGE PROCESSING DEVICE FOR IMAGE BLURRING

TECHNICAL FIELD

The disclosure relates to a method and an image processing device for image blurring.

BACKGROUND

A low-pass operation, also known as "blurring" or "smoothing", attenuates rapid changes in intensity and is a key technology of image enhancement. Edge-preserving filters that smooth away noise or textures while retaining sharp edges are one of the most commonly used low-pass filters. However, pixel-based edge-preserving filters (e.g. a sigma filter and a bilateral filter) require a significant amount of line buffers to perform vertical direct filtering, and block-based edge-preserving filters (e.g. a bilateral grid filter and a guide filter) cost a significant amount of memory to store block information.

On the other hand, local contrast enhancement enhances the visibility of local details of an image by increasing the contrast in local regions and is also a key technology of image enhancement. Histogram equalization is one of the most commonly used local contrast enhancement technique. However, such technique costs a significant amount of memory to store block information and causes inconsistent and unnatural look.

SUMMARY OF THE DISCLOSURE

A method and an image processing device for image blurring are proposed.

According to one of the exemplary embodiments, the method includes the following steps. An input image is received. A curve set is applied on the input image to generate a resultant image, where the curve set includes multiple pairs of weight functions and process functions, where a summation of a multiplication of the weight function and the process function in each of the pairs is zero, and where the weight function in each of the pairs is associated with low-pass filtering. An output image is generated according to the resultant image and the input image.

According to one of the exemplary embodiments, the image processing device includes a memory circuit and a processing circuit. The memory circuit is configured to store data. The processing circuit is configured to receive an input image, apply a curve set on the input image to generate a resultant image, and generate an output image according to the resultant image and the input image, where the curve set includes multiple pairs of weight functions and process functions, where a summation of a multiplication of the weight function and the process function in each of the pairs is zero, and where the weight function in each of the pairs is associated with low-pass filtering.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

Figure 1:
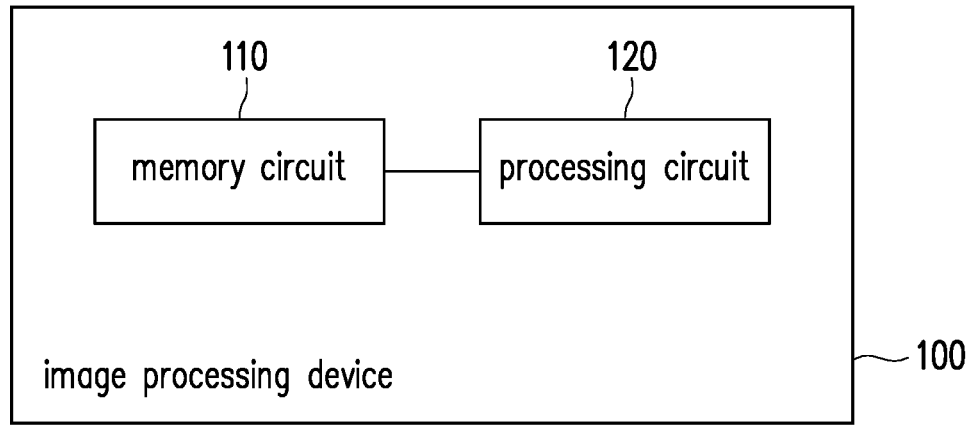
FIG. 1 illustrates a schematic diagram of a proposed image processing device in accordance with one of the exemplary embodiments of the disclosure.

To make the above features and advantages of the application more comprehensible, several embodiments accompanied with drawings are described in detail as follows.

DESCRIPTION OF THE EMBODIMENTS

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a schematic diagram of a proposed image processing device in accordance with one of the exemplary embodiments of the disclosure. All components of the image processing device and their configurations are first introduced in FIG. 1. The functionalities of the components are disclosed in more detail in conjunction with FIG. 2.

Referring to FIG. 1, an image processing device 100 would include a memory circuit 110 and a processing circuit 120 coupled thereto in the present exemplary embodiment. The image processing device 100 may be implemented as an integrated circuit (IC) or a computer system. The memory circuit 110 would be configured to store programming codes, device configurations, data, and so forth and may be implemented using any memory technology. The processing circuit 120 would be configured to implement functional elements of the proposed method in the following exemplary embodiments.

Figure 2:
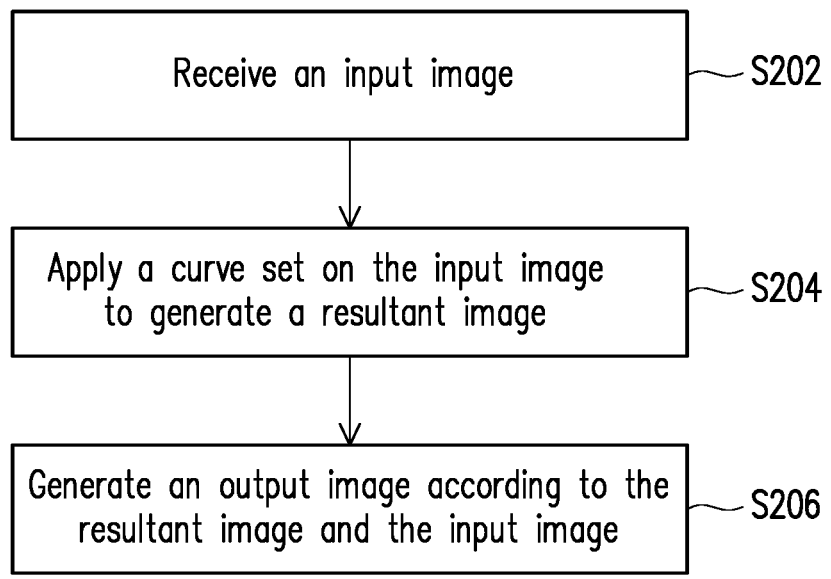
FIG. 2 illustrates a flowchart of a proposed method for image blurring in accordance with one of the exemplary embodiments of the disclosure.

FIG. 2 illustrates a flowchart of a proposed method for image blurring in accordance with one of the exemplary embodiments of the disclosure. The steps of FIG. 2 could be implemented by the proposed image processing device 100 as illustrated in FIG. 1.

Referring to FIG. 2 in conjunction to FIG. 1, the processing circuit 120 of the image processing device 100 would receive an input image (Step S202). Herein, the input image could be an image in any color space, and the input image includes pixels having pixel values such as luminance or intensity as known per se. Next, the processing circuit 120 would apply a curve set on the input image to generate a resultant image (Step S204). The curve set would include multiple pairs of weight functions and process functions, and the weight function in each of the pairs would be associated with low-pass filtering. In the present exemplary embodiment, each of the weight functions and the process functions may be stored as a form of a lookup table in the memory circuit 110. Different curve sets would provide different image processing effects, and more details would be given later on. The summation of the multiplication of the weight function and the process function in each of the pairs would be zero as represented in Eq.(1):

$$\sum_{k=1}^{n} W_k(x) P_k(x) = 0 \qquad \text{Eq.(1)}$$

Herein, x denotes a pixel value, $W_k(x)$ and $P_k(x)$ denote the weight function and the process function of the $k^{th}$ pair in the curve set. Once the resultant image is generated, the processing circuit 120 would generate an output image according to the resultant image and the input image (Step S206) for a more natural output result.

Figure 3:
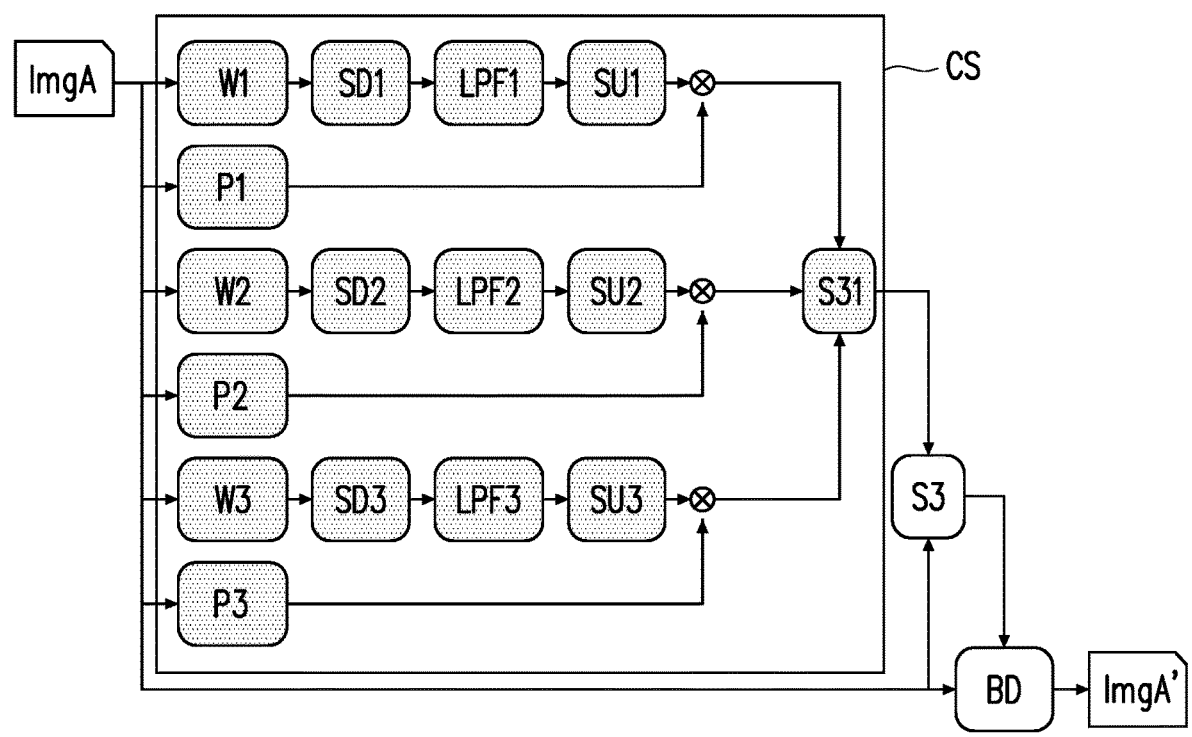
FIG. 3 illustrates a functional flowchart of a proposed method for image blurring in accordance with another one of the exemplary embodiments of the disclosure.

For better comprehension, FIG. 3 illustrates a functional flowchart of a proposed method for image blurring in accordance with another one of the exemplary embodiments of the disclosure.

Referring to FIG. 3 in conjunction to FIG. 1, the processing circuit 120 would receive an image ImgA and apply a curve set CS thereon. In the present exemplary embodiment, the curve set CS would include three pairs of weight functions and process functions that satisfy Eq.(1) and would be dependent upon the objective of the image enhancement.

Figure 4:
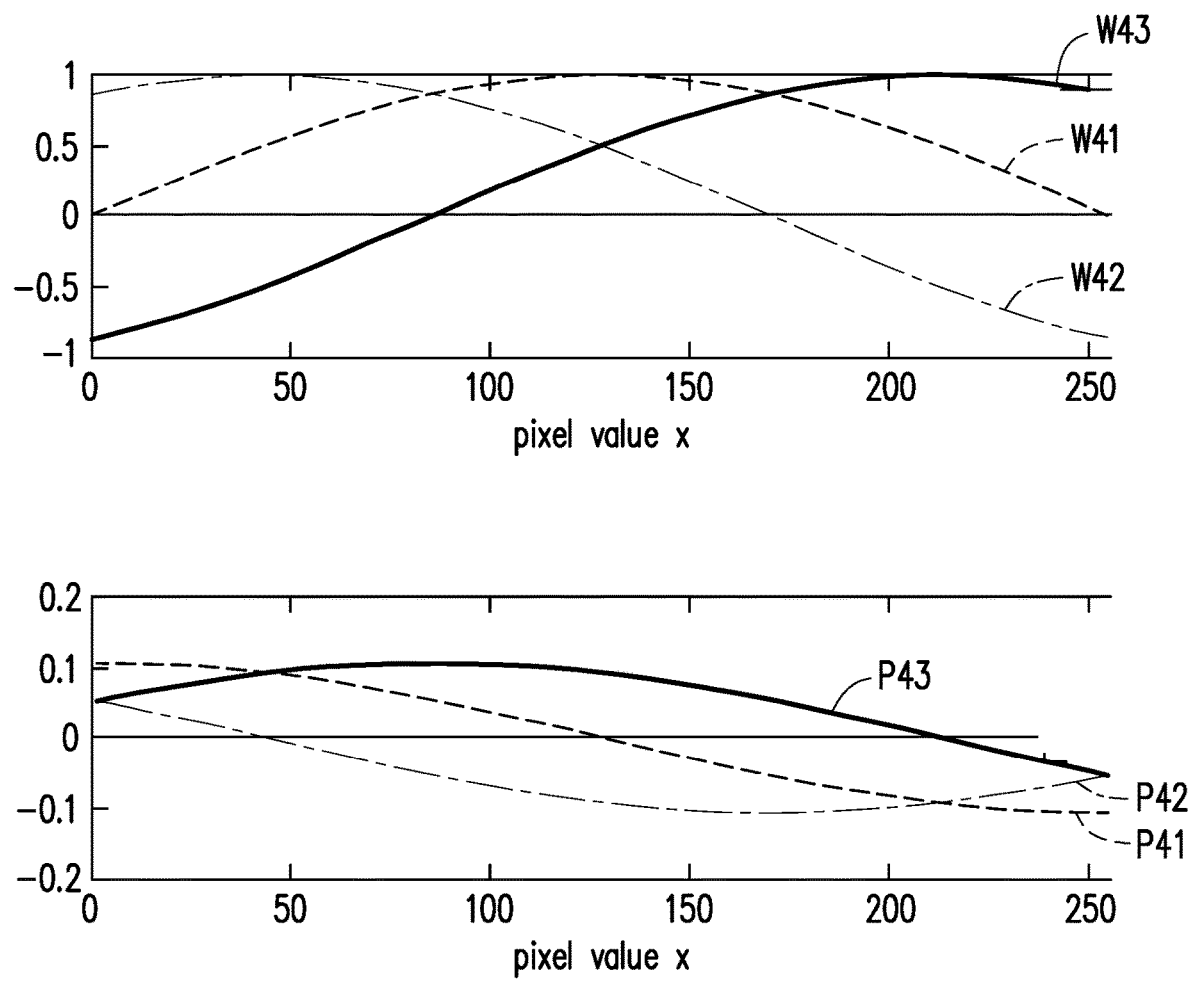
FIG. 4 illustrates a schematic diagram of a curve set corresponding to an edge-preserving effect in accordance with one of the exemplary embodiments of the disclosure.

As an example, FIG. 4 illustrates a schematic diagram of a curve set corresponding to an edge-preserving effect in accordance with one of the exemplary embodiments of the disclosure. Herein, the curve set would include three pairs of weight functions and process functions and could be written as Eq.(2), where Eq.(2) also satisfies the constraint of Eq.(1):

$$\begin{cases} W_1(x) = \cos\left(\left(\left(\frac{x}{255}\right) - \frac{1}{2}\right)\pi\right) \\ W_2(x) = \cos\left(\left(\left(\frac{x}{255}\right) - \frac{1}{6}\right)\pi\right) \\ W_3(x) = \cos\left(\left(\left(\frac{x}{255}\right) - \frac{5}{6}\right)\pi\right) \\ P_1(x) = -\sin\left(\left(\left(\frac{x}{255}\right) - \frac{1}{2}\right)\pi\right) \times a \\ P_2(x) = -\sin\left(\left(\left(\frac{x}{255}\right) - \frac{1}{6}\right)\pi\right) \times a \\ P_3(x) = -\sin\left(\left(\left(\frac{x}{255}\right) - \frac{5}{6}\right)\pi\right) \times a \end{cases} \qquad \text{Eq.(2)}$$

Herein, α is a constant. $W_1(x)$, $W_2(x)$, and $W_3(x)$ are weight functions and could be illustrated as curves W41, W42, and W43 in FIG. 4, and $P_1(x)$, $P_2(x)$, and $P_3(x)$ are process functions and could be illustrated as curves P41, P42, and P43 in FIG. 4. (W41, P41), (W42, P42), and (W43, P43) would be the three pairs of weight functions and process functions in the curve set.

Figure 5:
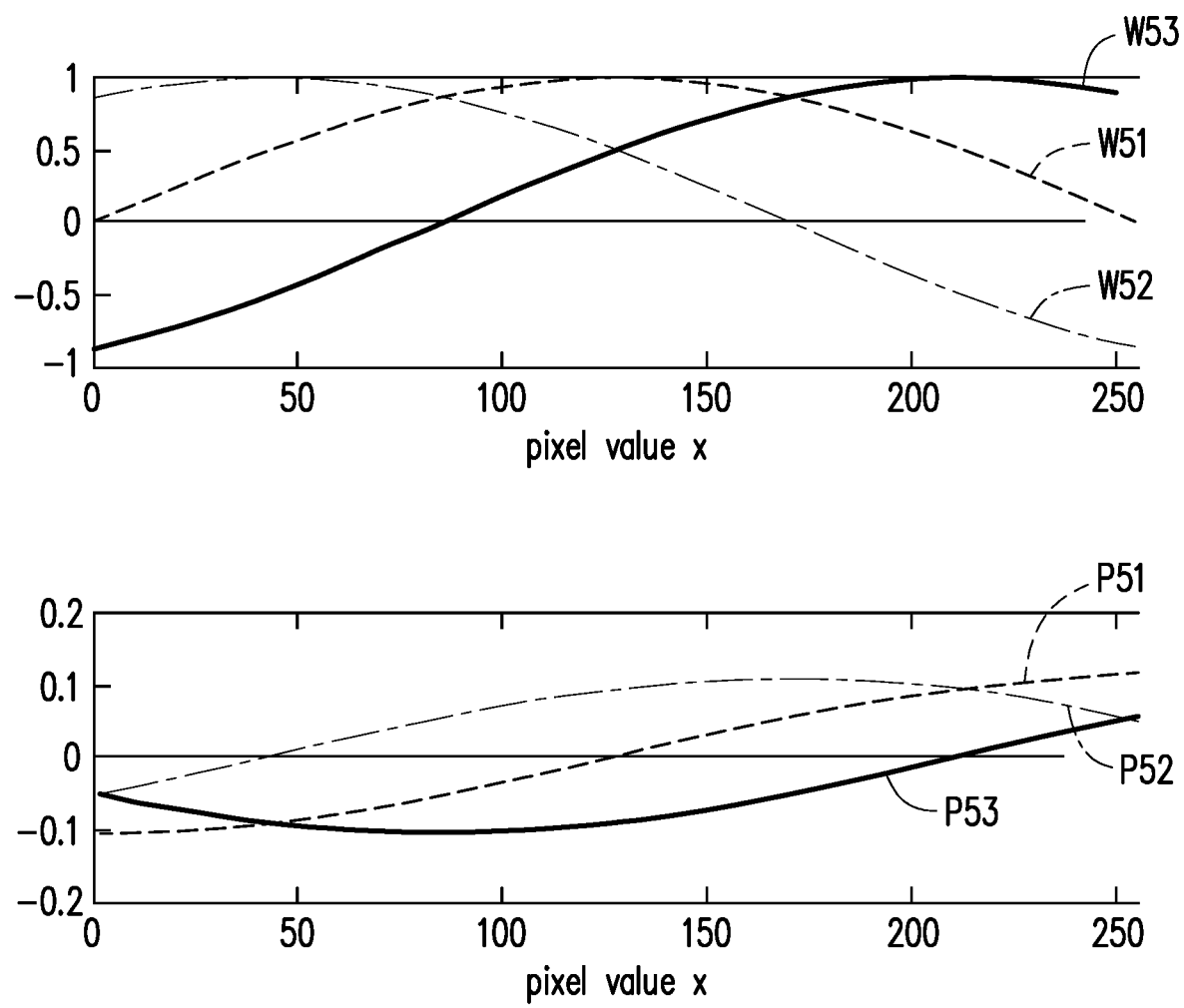
FIG. 5 illustrates a schematic diagram of a curve set corresponding to a local contrast effect in accordance with one of the exemplary embodiments of the disclosure.

As another example, FIG. 5 illustrates a schematic diagram of a curve set corresponding to a local contrast effect in accordance with one of the exemplary embodiments of the disclosure. Herein, the curve set would include three pairs of weight functions and process functions. The weight functions could be illustrated as curves W51, W52, and W53 in FIG. 5, and the process functions could be illustrated as curves P51, P52, and P53 in FIG. 5. (W51, P51), (W52, P52), and (W53, P53) would be the three pairs of weight functions and process functions in the curve set.

Referring back to FIG. 3, the processing circuit 120 would apply weight functions W1, W2, and W3 and process functions P1, P2, and P3 respectively on the input image ImgA to generate weighted images and processed images and then only apply low-pass filtering on the weighted images. In the present exemplary embodiment, the processing circuit 120 would apply low-pass filtering on the weighted images by scaling down SD1, SD2, and SD3 the weighted images to generate downscaled images, performing spatial low-pass filtering LPF1, LPF2, and LPF3 to generate low-pass downscaled images, and scaling up SU1, SU2, and SU3 the low-pass downscaled image to generate the filtered images. Herein, the processing circuit 120 would scale up the low-pass downscaled images to be equal to the size of the input images.

Once all the filtered images are generated, the processing circuit 120 would sum S31 the multiplication of all the filtered image and the processed image of each of the pairs to generate a processed image. In the present exemplary embodiment, the processing circuit 120 would sum S3 the processed image and the input image to generate a resultant image and then perform blending BD on the resultant image and the input image to generate an output image ImgA'. In the present exemplary embodiment, the processing circuit 120 may blend the resultant image and the input image according to a blending function that describes a relationship between a luminance and a blending weight of the resultant image. As an example, when the luminance is less than a luminance threshold, the greater the luminance, the greater the blending weight. In another exemplary embodiment, the processing circuit 120 may simply output the resultant image as a final output without blending. The disclosure is not limited in this regard.

It should be noted that, as compared with conventional filtering schemes, less memory is used to store block information in the proposed image processing device 100. For example, a bilateral grid filter would construct a 3D grid from an input image and perform three convolutions along with several trilinear interpolation operations. It would require significant amount of memory and computational complexity. On the other hand, only the data associated with the weight functions in the curve set are required to be additionally processed and stored in the proposed image processing device 100. Moreover, an entire image would be more consistent before and after being processed.

Figure 6:
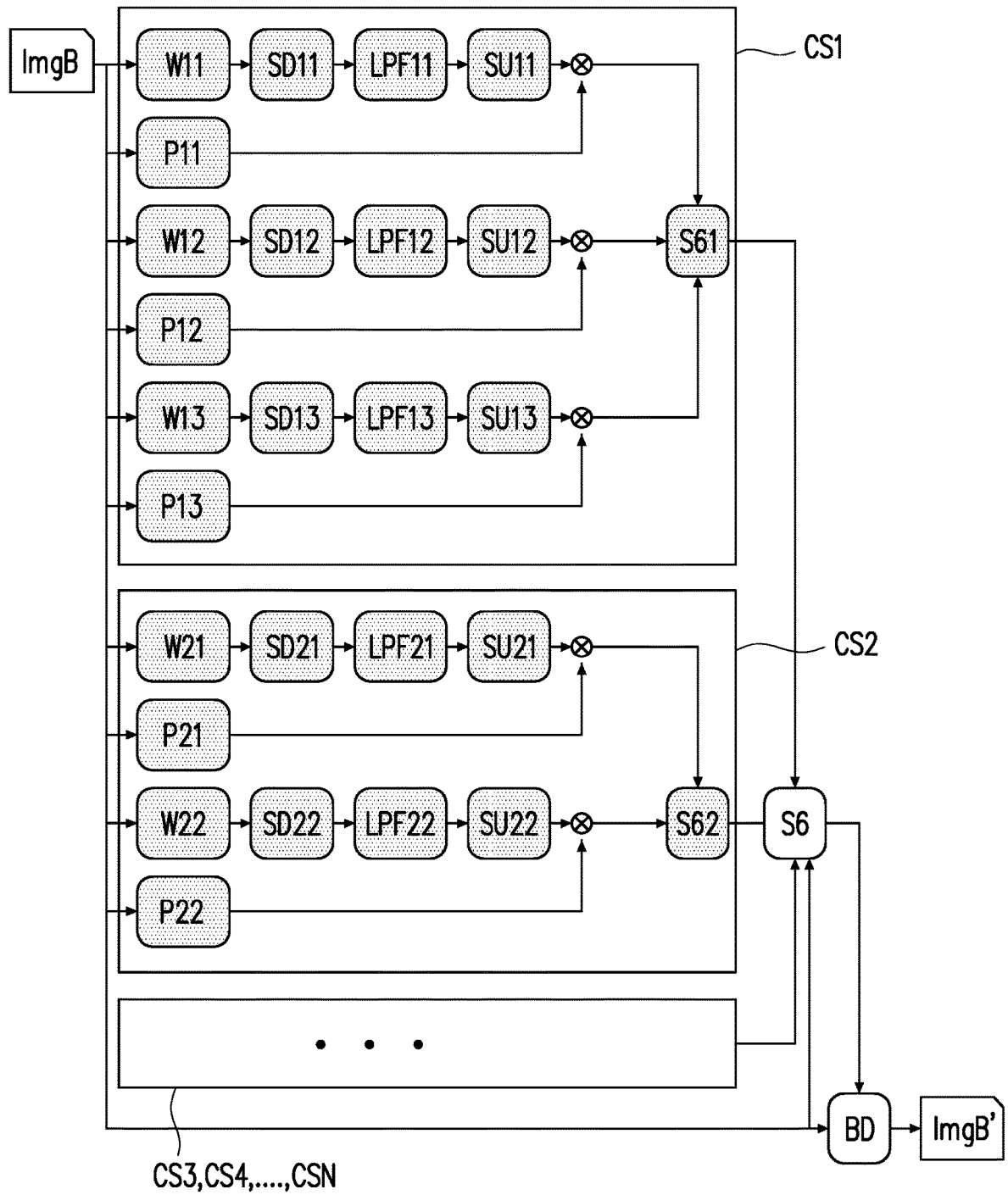
FIG. 6 illustrates a functional flowchart of a proposed method for image blurring in accordance with another one of the exemplary embodiments of the disclosure.

The method for image blurring in FIG. 3 could be extended to multiple curve sets as a functional flowchart of a proposed method for image blurring in accordance with another one of the exemplary embodiments of the disclosure as illustrated in FIG. 6.

Referring to FIG. 6 in conjunction to FIG. 1, the processing circuit 120 would receive an image ImgB and apply a curve set CS1 and at least one other curve set (e.g. CS2 and possibly CS3, CS4, . . . , CSN). The number of the pairs in each of the curve sets CS1, CS2, . . . , CSN may be dependent upon how well the image details could be represented and may be all the same, partially or all different. In general, three pairs of weight functions and process functions may be sufficient. For illustrative purposes, the curve set CS2 would include two pairs of weight functions and process functions that satisfy Eq.(1) and would be dependent upon the objective of the image enhancement. Herein, the objective of the image enhancement for the curve set CS2 may be different from the curve set CS1. For example, the curve set CS1 may provide an edge-preserving effect, and the curve set CS2 may provide a local contrast effect. As another example, the curve sets CS1 and CS2 may both provide edge-preserving effects for different degrees of smoothness (e.g. weight/process functions with different frequencies of sine/cosine waves).

Note that the curve set CS1 herein may be similar to the curve set CS in FIG. 3. The processing circuit 120 would apply weight functions W11, W12, and W13 and process functions P11, P12, and P13 respectively on the input image ImgB to generate weighted images and processed images and then only apply low-pass filtering on the weighted images. In the present exemplary embodiment, the processing circuit 120 would apply low-pass filtering on the weighted images by scaling down SD11, SD12, and SD13 the weighted images to generate downscaled images, performing spatial low-pass filtering LPF11, LPF12, and LPF13 to generate low-pass downscaled images, and scaling up SU11, SU12, and SU13 the low-pass downscaled image to generate the filtered images. Once all the filtered images are generated, the processing circuit 120 would sum S61 the multiplication of all the filtered image and the processed image of each of the pairs to generate a processed image.

As for the curve set CS2, the processing circuit 120 would apply the weight function W21 and W22 and the process function P21 and P22 respectively on the input image ImgB to generate weighted images and processed images and then only apply low-pass filtering on the weighted images. In the present exemplary embodiment, the processing circuit 120 would apply low-pass filtering on the weighted images by scaling down SD21 and SD22 the weighted images to generate downscaled images, performing spatial low-pass filtering LPF21 and LPF22 to generate low-pass downscaled images, and scaling up SU1 and SU2 the low-pass downscaled image to generate the filtered images. Once all the filtered images are generated, the processing circuit 120 would sum S62 the multiplication of all the filtered image and the processed image of each of the pairs to generate a processed image.

In the present exemplary embodiment, the processing circuit 120 would sum S6 all the processed images corresponding to all the curve sets CS1~CSN and the input image to generate a resultant image and then perform blending BD on the resultant image and the input image to generate an output image ImgB'. In the present exemplary embodiment, the processing circuit 120 would blend the resultant image and the input image according to a blending function that describes a relationship between a luminance and a blending weight of the resultant image.

In view of the aforementioned descriptions, the proposed method and image processing device provide different low-pass filtering schemes with less memory to store block information and maintain the consistency of an entire image.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for image blurring comprising:
   receiving an input image;
   applying a curve set on the input image to generate a resultant image, wherein the curve set includes a plurality pairs of weight functions and process functions, wherein a summation of a multiplication of the weight function and the process function in each of the pairs is zero, and wherein the weight function in each of the pairs is associated with low-pass filtering; and
   generating an output image according to the resultant image and the input image.

2. The method according to claim 1, wherein the step of applying the curve set on the input image to generate the resultant image comprises:
   for each of the pairs, applying the weight function and the process function respectively on the input image to generate a weighted image and a processed image;
   for each of the pairs, applying low-pass filtering on the weighted image to generate a filtered image; and
   summing the multiplication of the filtered image and the processed image of each of the pairs to generate the resultant image.

3. The method according to claim 2, wherein for each of the pairs, the step of applying low-pass filtering on the weighted image to generate the filtered image comprises:
   scaling down the weighted image to generate a downscaled image;
   performing spatial low-pass filtering on the downscaled image to generate a low-pass downscaled image; and
   scaling up the low-pass downscaled image to generate the filtered image.

4. The method according to claim 3, wherein for each of the pairs, the step of scaling up the low-pass downscaled image comprises:
   scaling up the low-pass downscaled image to be equal to the size of the input image.

5. The method according to claim 1, wherein the step of generating the output image according to the resultant image and the input image comprises:
   generating the output image by summing the resultant image and the input image.

6. The method according to claim 1, wherein the step of generating the output image according to the resultant image and the input image comprises:
   summing the resultant image and the input image to generate a summed resultant image; and
   generating the output image by blending the summed resultant image and the input image according to a blending function.

7. The method according to claim 6, wherein the blending function describes a relationship between a luminance and a blending weight of the resultant image when the luminance is less than a luminance threshold, the greater the luminance, the greater the blending weight.

8. The method according to claim 1, wherein the step of applying the curve set on the input image to generate the resultant image further comprises:
   applying at least one other curve set on the input image to generate at least one other resultant image.

9. The method according to claim 8, wherein the at least one other curve set comprises a second curve set including a plurality pairs of weight functions and process functions, and wherein the number of the pairs in each of the at least one other curve set is different from the number of the pairs in the curve set.

10. The method according to claim 8, wherein the curve set and the at least one other curve set correspond to different image processing effects.

11. The method according to claim 8, wherein the step of generating the output image according to the resultant image and the input image further comprises:
   generating the output image by summing the resultant image, the at least one other resultant image, and the input image.

12. The method according to claim 8, wherein the step of generating the output image according to the resultant image and the input image further comprises:
   summing the resultant image, the at least one other result image, and the input image to generate a summed resultant image; and
   generating the output image by blending the summed resultant image and the input image.

13. An image processing device comprising:
   a memory circuit, configured to store data;
   a processing circuit, configured to:
      receive an input image;
      apply a curve set on the input image to generate a resultant image, wherein the curve set includes a plurality pairs of weight functions and process functions, wherein a total sum of a multiplication of the weight function and the process function in each of the pairs is zero, and wherein the weight function in each of the pairs is associated with low-pass filtering; and
      generate an output image according to the resultant image and the input image.

14. The image processing device according to claim 13, wherein the weight function and the process function in each of the pairs in the curve set are stored as a form of a lookup table in the memory circuit.

15. The image processing device according to claim 13, wherein for each of the pairs, the processing circuit is configured to apply the weight function and the process function respectively on the input image to generate a weighted image and a processed image and to apply low-pass filtering on the weighted image to generate a filtered image, and
   wherein the processing circuit is configured to sum the multiplication of the filtered image and the processed image of each of the pairs to generate the resultant image.

16. The image processing device according to claim 13, wherein the processing circuit is further configured to apply at least one other curve set on the input image to generate at least one other resultant image.

17. The image processing device according to claim 16, wherein the at least one other curve set comprises a second curve set including a plurality pairs of weight functions and process functions, and wherein the number of the pairs in each of the at least one other curve set is different from the number of the pairs in the curve set.

18. The image processing device according to claim 16, wherein the curve set and the at least one other curve set correspond to different image processing effects.

19. The image processing device according to claim 13, wherein the curve set provides an edge-preserving effect on the input image.

20. The image processing device according to claim 13, wherein the curve set provides a local contrast effect on the input image.

* * * * *